July 20, 1926.  1,593,230
R. VARLEY
ARMATURE FOR MAGNETOS AND THE LIKE
Filed May 17, 1921  4 Sheets-Sheet 1
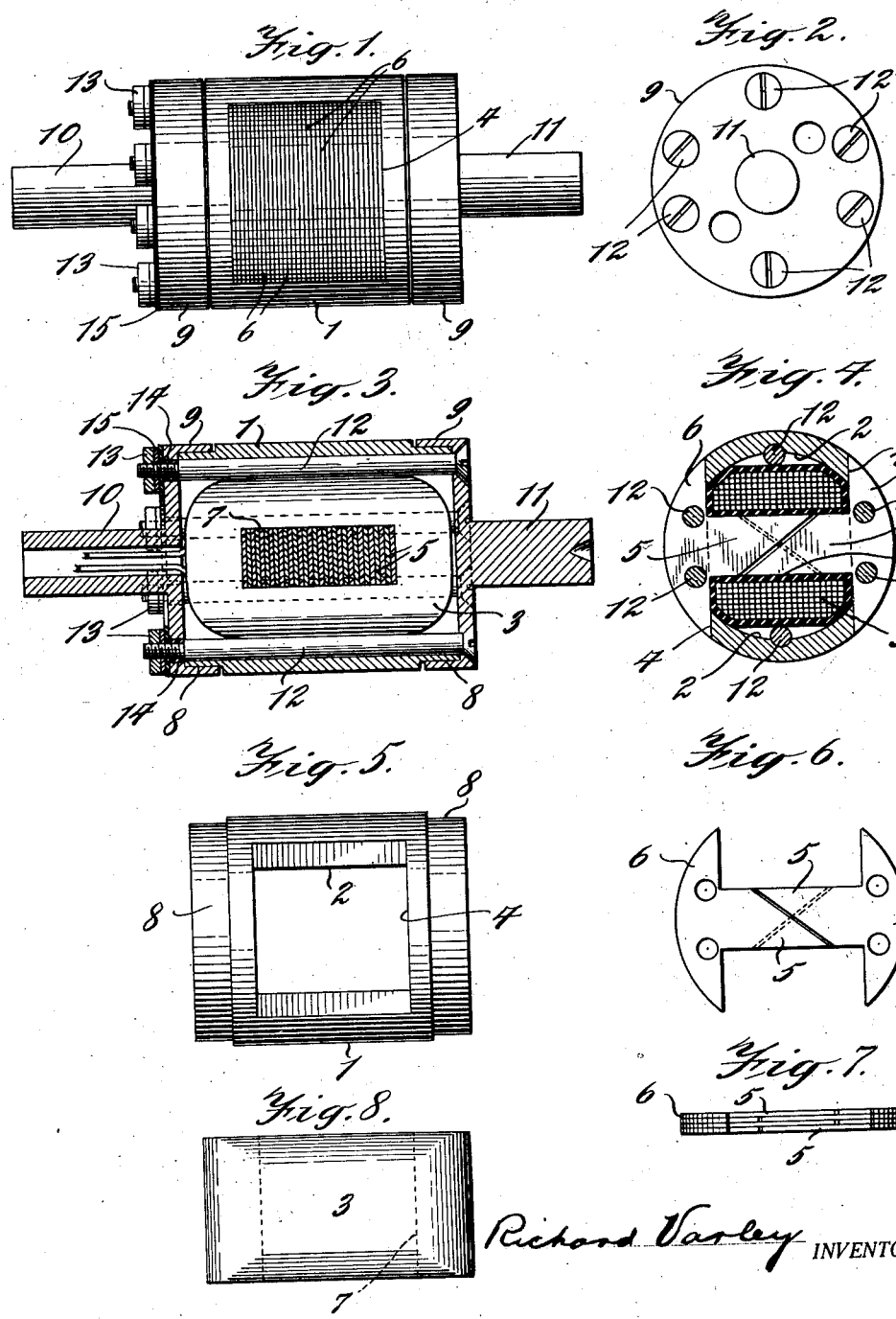

July 20, 1926.
R. VARLEY
1,593,230
ARMATURE FOR MAGNETOS AND THE LIKE
Filed May 17, 1921
4 Sheets-Sheet 2
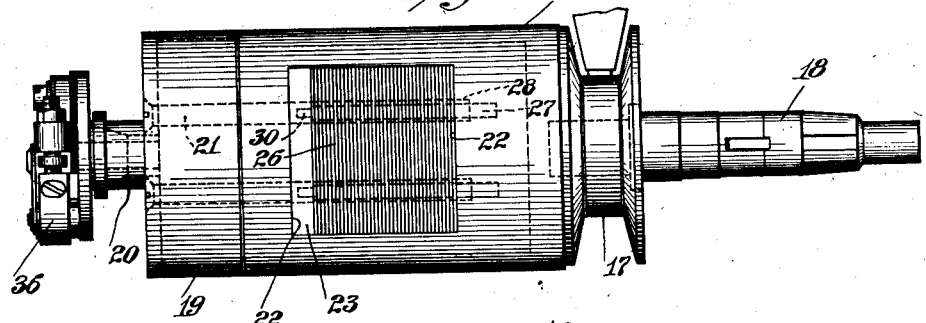
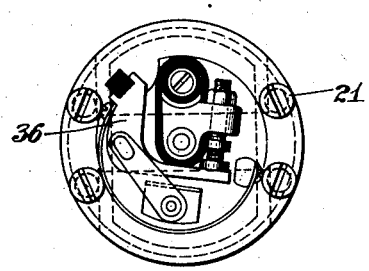
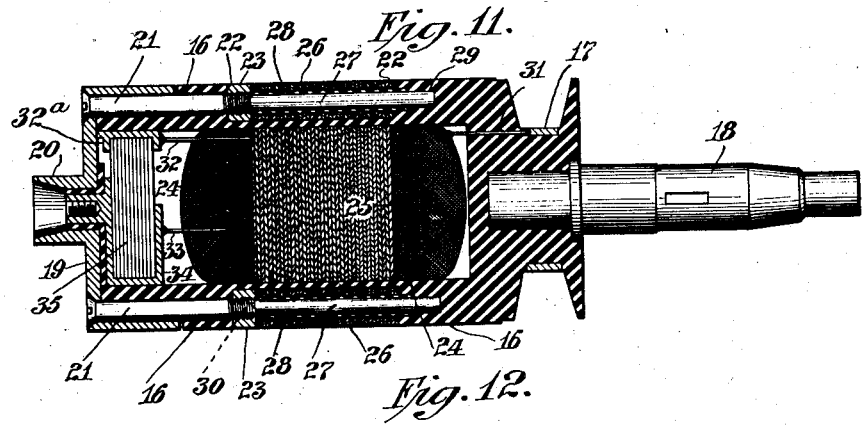
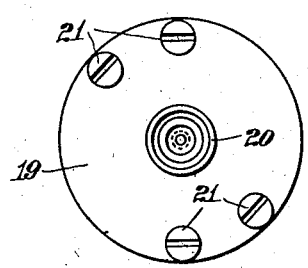
INVENTOR
Richard Varley
BY
Rosenbaum Stockbridge & Borst
ATTORNEYS July 20, 1926.  
R. VARLEY  
ARMATURE FOR MAGNETOS AND THE LIKE  
Filed May 17, 1921  
1,593,230  
4 Sheets-Sheet 3

INVENTOR  
Richard Varley  
BY  
ATTORNEYS

July 20, 1926. 1,593,230
R. VARLEY
ARMATURE FOR MAGNETOS AND THE LIKE
Filed May 17, 1921 4 Sheets-Sheet 4

INVENTOR
Richard Varley
BY
Rosenbaum Stockbridge & Borst
ATTORNEYS

Patented July 20, 1926.

1,593,230

UNITED STATES PATENT OFFICE.

RICHARD VARLEY, OF ENGLEWOOD, NEW JERSEY, ASSIGNOR TO VARLEY DUPLEX MAGNET COMPANY, A CORPORATION OF NEW JERSEY.

ARMATURE FOR MAGNETOS AND THE LIKE.

Application filed May 17, 1921. Serial No. 470,331.

In armatures for magnetos having a single coil, the winding has heretofore been made directly upon the core or armature frame, which is a rather slow operation and requires considerable skill, especially where the amount of wire used on each should be uniform. In such windings, the coil was always exposed to possible injury such as by contact or water owing to the fact that the core or frame was necessarily open in order to permit of the wrapping of the wires around the same during the formation of the coil.

The frames for such armatures usually comprise a plurality of core laminations that are clamped between end bearings by means of screws which pass between the bearings. When these frames are assembled and the clamping screws are tightened sufficiently to make the frame rigid, usually one side or the other of the group of laminations will be compressed more than the other which will throw the end bearings out of alignment, destroy some of the insulation between the laminations and thereby lose the advantage intended by the use of the laminations, and in use the insulation on one side may yield slightly which would also throw the bearings out of alignment.

An object of the invention is to provide armatures for either high or low tension magnetos and the like, also armatures for direct current machines, in which the armature coil or coils can be wound in quantities before they are associated with the core or frame, by multiple automatic winding machines where the winding cost is usually from $\frac{1}{10}$ to $\frac{1}{20}$ of the winding cost of similar coils wound one at a time directly upon the core or frame as heretofore. A further object is to provide an armature in which the frame is inherently rigid without reliance for strength or rigidity upon the laminations; in which the frame is constructed to minimize eddy currents; and in which the laminations are not subjected to forces which would injure the insulation between them. A further object is to provide an armature in which the coil or coils can be subjected to a first or dry test and if faulty quickly and easily replaced; in which the coil or coils are almost entirely or are entirely protected on all sides; and which is exceptionally light, strong, rigid, durable and inexpensive to manufacture. A further object is to provide an armature which when assembled will always be in exceptionally accurate alignment.

Various other objects and advantages will be apparent from the following description of various embodiments of my invention and the novel features will be particularly pointed out in claims.

In the practice of my invention I preferably provide a suitable casing or body member which may be of metal, but which is preferably formed wholly or in part of insulating material such as a phenolic condensation product, molded to the desired shape and size, and having openings in the sides for the reception of a core, and an opening in at least one end into which a separately wound coil or coils may be inserted and locked therein by the insertion of the core. Bearing extensions may be provided upon the ends of the casing for closing and supporting the same for rotation. The core preferably comprises laminations which may be locked together and within the casing by various expedients and which may be divided or partly integral and partly divided. For example a suitable manner of locking the core within the casing may consist in passing securing members through the casing, and the core laminations to hold the latter within the former and which may also serve the function of securing one or both of the bearings to the casing. To minimize eddy currents in the securing members I preferably insulate them at their connection to one of the end bearing caps if the latter are of metal, since otherwise a short circuit would be formed between the connecting members. If the casing is largely of conducting material it is split inwardly from one end and the free ends clamped by an insulating member.

At least some of the laminations may be divided so as to permit of their insertion into the casing and through the coil or coils from the sides of the casing. The invention also comprises various other details and arrangements of parts which will be hereinafter more fully explained.

In the drawings:

Fig. 1 is an elevation of an armature for low tension machines which has been constructed in accordance with my invention.

Fig. 2 is an end elevation of the same.

Fig. 3 is a longitudinal sectional elevation of the same.

Fig. 4 is a transverse sectional elevation of the same.

Fig. 5 is an elevation of the casing or body member.

Fig. 6 is a plan of the core.

Fig. 7 is an elevation of a few laminations of the same.

Fig. 8 is an elevation of a coil unit.

Fig. 9 is an elevation of a slightly modified armature especially adapted for high tension magnetos.

Fig. 10 is an end elevation of the same.

Fig. 11 is a longitudinal sectional elevation of the same with the contact breaker removed.

Fig. 12 is an end elevation of the same.

Figure 13:
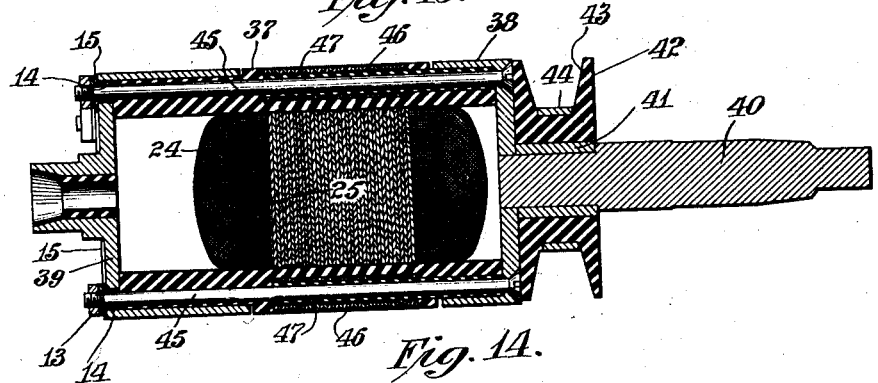
Fig. 13 is a sectional elevation of a further modified form of armature.

In the embodiment of a low tension armature illustrated in Figs. 1 to 8, a cylindrical body member or casing 1 of suitable non-magnetic material, preferably moldable insulating material such as a phenolic condensation product, is provided with a central cavity 2 opening inwardly from both ends and of a size and shape capable of receiving through the open ends a complete coil unit 3. The member or casing 1 is also provided with diametrically opposed apertures 4 in its side walls which lead to the central cavity 2 and which receive a divided core 5. The divisions of the core in this embodiment are shown as built entirely of divided laminations which are arranged to abut and overlap at their inner ends so as to form in effect a continuous core, and have enlarged heads 6 which are received within enlargements in the outer ends of the apertures 4 and form continuations of the outer peripheral surface of the member or casing 1. The complete coil 3 has a central transverse passage 7 through which the divisions of the core 5 extend and abut one another.

The member or casing 1 is provided at its ends with slightly reduced shoulders 8 which receive and support flanges 9 of end bearing elements 10 and 11. The elements 10 and 11 have small cylindrical aligned extensions by means of which the member or casing 1 is rotatably supported. The extension on one of the elements, such as 10, is hollow for the passage of one of the coil terminal conductors to a collector ring (not shown) that is carried on that extension, the other terminal of the coil being grounded as usual in these devices. The end bearing elements are held upon the ends of the body member or casing by bolts 12 which pass through the body member or casing and between the bearing elements, and are held against removal by nuts 13. Some of the bolts also pass through the divisions of the core for holding them within the body member or casing, and through the cores holding the coil within the cavity. In the apertures in one of the end bearing elements through which the bolts pass bushings 14 of insulating material are inserted, and a ring 15 of insulating material is interposed between the end bearing elements and the nuts so as to completely insulate the bolts from one of the end bearing elements. If this insulation or its equivalent were not provided, the electrical connection of the bolts to the end bearing elements would provide the equivalent of a short circuited coil moving in a magnetic field which would not only require the application of additional energy to drive the coil through the field but would cause excessive heating of the short circuited conductors and prevent proper working of the armature.

The core 5 is preferably laminated with the line of contact of each abutting pair of laminations arranged crosswise of, or stepped, or obliquely to those of the adjacent pairs. In assembling the laminations, the coil is first inserted into the casing, the bolts 12 passed through one of the end bearing elements and the casing until the ends of those passing through the apertures 4 are partially across these apertures, the laminations then placed in the desired overlapping arrangement of their ends, alternately through each aperture 4, and the bolts slowly shifted to align and hold the laminations of each division until complete. The bolts are then shifted completely through the casing and the other end bearing element attached. With an armature constructed in this manner, the complete coils can be wound in multiple automatic winding machines and then inserted into the casing. If trouble in the coil, such as a short or open circuit condition, is found during the first assembled or dry test the coil can be quickly replaced with a new one from a stock supply without the delay and expense necessary if the armature would have to be rewound upon the old core, as in prior armature constructions. The coils wound in the automatic machines all have substantially the same amount of wire which makes them of uniform resistance. To remove the coil it is merely necessary to remove the end bearing element which closes the cavity and remove the bolts and core divisions which release the coil. The casing of a phenolic condensation product protects the coil from injury by water or contact, and being a non-conductor of electricity will not have eddy currents induced therein by its movement in the magnetic field. To more completely protect the coil, I may if desired, after the armature is assembled, and the first test indicates no coil trouble, fill the interior of the casing not actually occupied by the coil with a soft binder composition of a phenolic condensation product and then harden the filling by baking the whole armature. The casing may be open at either one or both ends to provide access to the cavity and closed by the end bearing elements, but preferably only one end is open to the cavity.

In the embodiment illustrated in Figs. 9 to 12, for high tension machines, the hollow cylindrical body member or frame 16 is formed of a phenolic condensation product with one end closed and integral with the lateral portion and with the slip ring 17 and the adjacent end bearing member 18 molded therein. The open end of the member or frame 16 is closed by the metal end cap 19 having the hollow bearing extension 20 in alignment with the bearing member 18. The cap 19 fits over a slightly reduced end portion of the member 16 and is secured thereto by screws 21 which pass through the end cap and into the member 16 lengthwise thereof. The member 16 is provided with diametrically disposed apertures 22 in its sides into which the screws 21 extend. A short arcuate bar 23 is disposed in each aperture at the end adjacent the open end of the members and with which the ends of the screws 21 have threaded engagement to prevent their withdrawal. The coil unit 24 which may be advantageously wound in multiple automatic winding machines is inserted into the interior of the cylindrical body member or frame before the application of the end cap 19 to the member, with the inner aperture 25 of the coil in alignment with the apertures 22 of the body member 16. A laminated core 26 is then inserted through the aligned apertures in the body member and coil, the core having apertures extending transversely thereof and in alignment with the screws 21. Soft iron pins 27 each surrounded by an insulating sleeve 28 pass through the apertures in the core and into recesses 29 in the body member, the pins each having a reduced end portion 30 which is received within the abutting end of a screw 21 as illustrated in Fig. 11. The cross section of the core is, by its use of the soft iron pins, decreased merely by the space occupied by the insulating sleeves, and these sleeves by insulating the pins 27 from the screws that lead to the end cap avoid the danger of a continuous closed circuit for eddy currents which may be set up by movement in the magnetic field of the conducting parts. The sleeves 28 increase the efficiency of the laminations by also preventing any electrical connection between the laminations caused by their contact with the screws or pins. The external diameter of the sleeves 28 is small enough to permit of their passage through the holes in the body member provided for the screws 21.

One end of the coil unit is connected by a connector 31 to the slip ring 17 and the other extreme end of the unit is grounded to the frame of the machine such as by a connector 32 and a conducting element 32ª abutting cap 19. An intermediate point of the coil is connected by a connector 33 to one side 34 of a suitable condenser 35 that is disposed within the body member or casing adjacent the end cap 19, the opposite side of the condenser formed by conducting element 32ª being grounded to the frame of the machine. The intermediate connector 33 divides the coil unit into two parts one of which is the primary winding and the entire unit is the secondary winding, as well known in the art. A suitable make and break device 36 such as is well known in the art is carried by the bearing extension 20 and has one of its contacts connected to the condenser terminal 34, and the other grounded to the machine frame, as common in devices of this kind.

Figure 14:
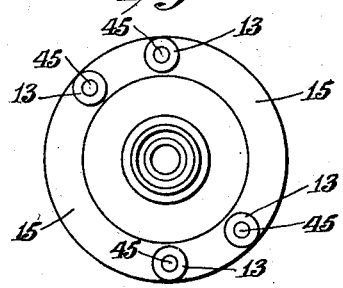
Fig. 14 is an end elevation of the same.
Figure 15:
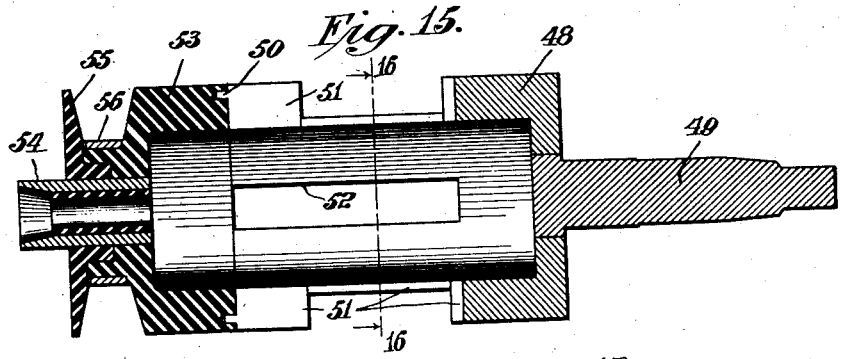
Fig. 15 is a sectional elevation of a further modified form of armature.
Figure 16:
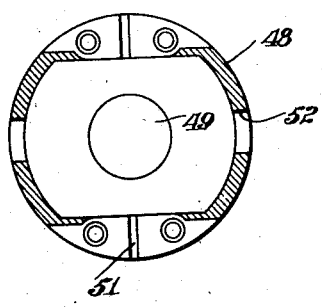
Fig. 16 is a transverse sectional elevation of the same taken substantially along the line 16—16 of Fig. 15.
Figure 17:
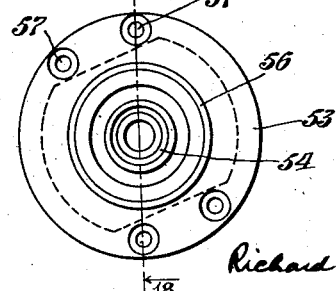
Fig. 17 is an end elevation of the insulating end cap of the same with a flange of the slip ring groove removed.
Figure 18:
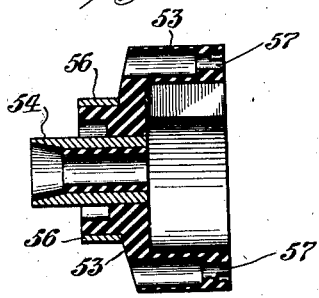
Fig. 18 is a section of the same taken substantially along the line 18—18.
Figure 19:
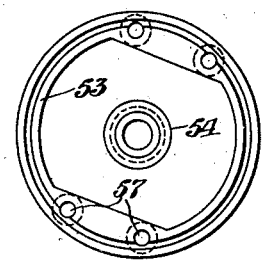
Fig. 19 is another end elevation of the insulating end cap.

In the embodiment illustrated in Figs. 13 and 14, the cylindrical body member or casing 37 is open at both ends with its external end portions slightly reduced to receive metal end caps 38 and 39. The end cap 38 has a fixed bearing extension 40 and a surface 41 concentric with the axis of the extension 40 which receives and fixedly supports a spool 42 of insulating material such as a phenolic condensation product, carrying in its central groove 43 a suitable slip ring 44 of conducting material. The end caps are held upon the body member by screws 45 which pass between the end caps and through the body member and the core 46. Insulating sleeves 47 surround the portion of the screw which passes through the core and may also extend along the screw for a short distance. The screws 45 are insulated from one of the caps in the manner explained for the construction of Figs. 1 and 2. The screws are inserted into the body member before the spool 42 is applied to the surface 41 since a flange of the spool insulates the carbon holder from the screws 45.

In the embodiment illustrated in Figs. 15 to 19 the body member 48 is made of a suitable non-magnetic conducting material such as brass or copper. The member has one closed integral end in which one bearing extension 49 is fixed, the other end being open and provided with a concentric end rib 50. The member is provided with a pair of slots 51 extending from the open end lengthwise thereof nearly to the other end and through these apertures in the sides of the member the core may be passed. The member is also provided with slots 52 extending similarly to slots 51 but at points intermediate of the space between the apertures for the passage of the core. The open end is closed by a cap 53 of suitable insulating material such as a phenolic condensation product, which fixedly carries the bearing extension 54. A flanged disc 55 is carried upon the bearing extension 54 and interlocked thereto or to the cap 53 in any suitable manner, the flanged disc and the end of the cap forming a spool for retaining the usual slip ring 56 in the groove thereof. The cap 53 is provided with a concentric groove in its end which receives the rib 50 and clamps the split ends of the body member against movement together or apart and rigidly couples the cap and member. The cap is provided with apertures 57 through which pass suitable screws (not shown) for securing the end cap 53 to the body member, and a core within the member and coil unit, as in the form shown in Fig. 11, the heads of the screws being considerably countersunk so as to be away as far as possible from the carbon holder which runs in the groove of the spool.

Figure 22:
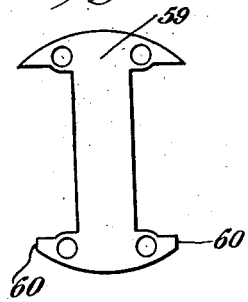
Fig. 22 is a plan of one of the core laminations which I may employ.
Figure 23:
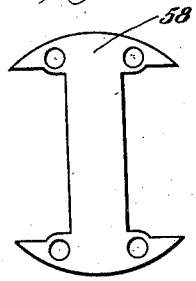
Fig. 23 is a plan of another of the core laminations which I may employ.
Figure 24:
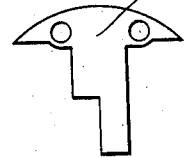
Fig. 24 is a plan of another form of the divided core laminations which I may employ.
Figure 25:
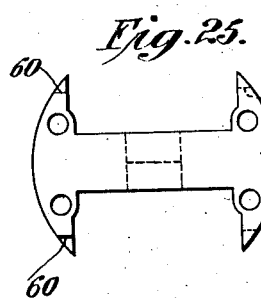
Fig. 25 is a plan of some assembled laminations of several kinds which I preferably employ together.

The laminations in any of the illustrated forms may be divided as illustrated in Figs. 4, 6 and 7, or complete lamination strips 58 and 59, shown in detail in Figs. 22 and 23 may be used in combination with divided laminations. The divided laminations may, instead of being cut obliquely as shown in Figs. 4, 6 and 7, be of the stepped shape as shown in Fig. 24, and it will be obvious that in the manufacture of either of these divided laminations, a single die can be used to cut all of each type since it is merely necessary to reverse alternate ones when assembling in order to make them abut closely without a gap between them.

Figure 20:
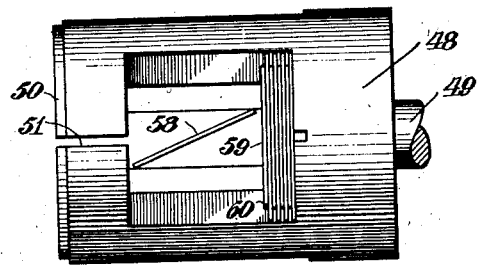
Fig. 20 is a plan of the armature casing or frame of Fig. 15 with the insulating end cap removed and with the core laminations partially in place to show their manner of insertion.
Figure 21:
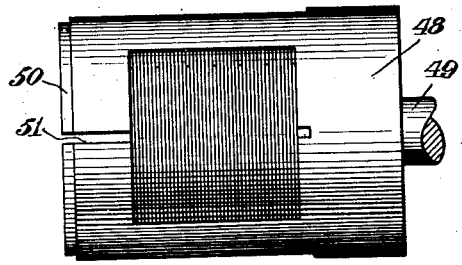
Fig. 21 is a view similar to Fig. 20 but showing all of the core laminations in place.

The preferred arrangement is to use as many as possible of the complete laminations and the balance of the divided laminations of either type. In Figs. 20 and 21 I have illustrated the manner in which they are assembled in the body member and coil unit. By turning the integral laminations cornerwise of the apertures in the coil unit and body member, the heads can be passed through the aligned apertures and the laminations then turned to their proper position. As many as possible of the integral laminations 58 are first inserted, and then as many more as possible of the integral laminations 59 inserted between groups of the previously inserted laminations. The laminations 59 are similar to laminations 58 with the exception that the side edges of one head of each of the former have been cut off as shown at 60 so as to reduce the clearance necessary and enable their insertion after no more of 58 can be inserted. The divided laminations 61 or 5 are next inserted as uniformly as possible between the integral laminations until the core is complete, after which the securing pins, rods or screws and insulating sleeves are inserted through the laminations to prevent their relative displacement. The core thus built up can be further impregnated with a phenolic condensation product binder and treated to harden the binder and produce a practically solid laminated core, the binder serving to assist in holding the divided laminations against removal from the apertures by causing them to adhere to the itegral laminations and the latter by reason of their heads cannot leave the apertures. The centrifugal action upon the divided laminations is resisted not only by the screws or pins but also by the binder and the heads of the integral laminations.

In all of the illustrated constructions it will be observed that there is no dependence for rigidity upon the laminations and the armature when assembled will always have a very accurate alignment which will not be disturbed by the assembly of the lamination securing means. The body member practically encloses and protects the coil unit, but after the armature is assembled and tested, the interior of the same can be filled with a suitable insulating cement or binder such as one of a phenolic condensation product, which is subsequently hardened to form a water tight enclosure for the coil. The course for any of the types of coil. The course for any of the types of body members illustrated may be composed of all divided laminations or partly of divided and partly of integral laminations. I may refer to these cores as sectional, meaning that they are assembled not as a unit but in parts, which parts may comprise single divided or integral laminations or groups of any of these separately or together.

It will be understood that various changes in the details and arrangements of the illustrated and described embodiments may be made within the principle and scope of the invention.

I claim:

1. In an armature for magnetos and the like, a hollow body member having apertures in the side walls and an open end leading to the cavity therein, a complete coil having a central aperture adapted to be inserted into and removed from the cavity through the open end and being encased and protected by said body member when therein, a core for the coil adapted to be inserted in sections through the apertures in the side walls of the member and into the aperture of the coil, said core locking the coil within the cavity, end bearing elements for closing the open end and supporting the member and coil for rotation together, and attaching devices passing between the end bearing elements and through the sections of the core to hold the latter within the member and secure the end bearing elements to the member.

2. In an armature from magnetos and the like, a cylindrical casing having a cavity therein opening from one end, a complete coil unit in said cavity and encased and protected by said casing, said unit being insertable into and removable from the casing through the opening in said one end, a core removably inserted transversely through the casing and also passing through the coil unit to form the core thereof, said core locking the coil within the casing, and bearing elements provided upon the ends of the casing, the element, upon the end having said opening, closing said opening and being removably attached to the casing, whereby it may be removed to permit removal or introduction of the coil unit.

3. In an armature for magnetos and the like, a body member having a cavity therein with an opening from at least one end, a complete coil unit with a central opening disposed in said cavity and encased and protected by said member, a core passing through the body member and central opening of the coil to lock the latter within the cavity against removal through the end opening, bearing elements carried by the ends of the body member and closing the cavity opening, and means passing between the elements and locking the core within the member.

4. In an armature for magnetos and the like, a body member having a cavity therein with an opening from at least one end, a complete coil unit with a central opening disposed in said cavity, a core passing through the body member and central opening of the coil to lock the latter within the cavity said core comprising laminations at least a portion of which are divided and inserted from opposite sides of the body member and having at their inner ends edges abutting on lines oblique to the direction of insertion of the core laminations.

5. In an armature for magnetos and the like, a body member having a cavity therein with an opening from at least one end, a complete coil unit with a central opening disposed in said cavity, a core passing through the body member and central opening of the coil to lock the latter within the cavity, said core comprising laminations at least a portion of which are divided and inserted from opposite sides of the body member and having, at the inner ends of laminations of the same plane, end edges abutting on lines oblique to the direction of the insertion of the laminations, the abutting end edges of each pair in the same plane being crosswise of those of each adjacent pair.

6. In an armature for magnetos and the like, a body member of non-magnetic material having a cavity therein and apertures leading thereto from opposite sides of the member, a complete coil unit insertable into or removable from the cavity, a laminated double headed core inserted in sections through the apertures and coil, at least a portion of the laminations being divided to permit of their insertion from opposite sides of the body member, each pair of abutting divisions of the divided laminations overlapping both of the divisions of each adjacent abutting division, and bearing elements carried by the ends of the body member.

7. In an armature for magnetos and the like, a body member of non-magnetic material having a cavity therein and apertures leading thereto from opposite sides of the member, a complete coil unit insertable or removable from the cavity, a laminated double headed core the laminations of which are inserted through the apertures and coil, at least a part of the laminations being divided to permit of insertion from opposite sides, the line of abutment of each pair of divided laminations being out of alignment with the line of abutment of each adjacent divided pair whereby the layers of divided laminations of the sections overlap, and bearing elements carried by the ends of the body member.

8. In an armature for magnetos and the like, a body member of non-magnetic material having a cavity therein and apertures leading thereto from opposite sides of the member, a complete coil unit insertable into or removable from the cavity, a sectional laminated core the sections of which are inserted through the apertures and coil, a portion of the sections being divided to permit of insertion from opposite sides, each pair of abutting divisions overlapping the division of each adjacent divided pair, bearing elements carried by the ends of the body member, and members passing between the end elements and through the core for securing the end elements to the body member and the core sections within the apertures of the body member.

9. In an armature for magnetos and the like, a body member of non-magnetic material having a cavity therein opening from one end and apertures leading thereto from opposite sides of the member, a complete coil unit insertable into or removable from the cavity through the open end, a sectional core the sections of which are inserted through the apertures and coil, at least a portion of the sections being divided to permit of insertion from opposite sides, the line of abutment of each divided pair of sections being out of alignment with the line of abutment of each adjacent divided pair whereby the divided sections overlap, bearing elements carried by the ends of the body member and closing the said open end, and members passing between the end elements and through the core for securing the core sections within the body member and the end elements to the body member.

10. In an armature for magnetos and the like, a hollow body member of molded insulating material and having apertures in the side walls, a coil unit adapted to be inserted into the hollow member, a straight core adapted to be inserted into the apertures and coil unit diametrically of the body member, and bearing extensions carried by the member, one of which extensions is molded in the member.

11. In an armature for magnetos and the like, a hollow body member of molded insulating material having apertures in its side walls and a groove in one end portion, a slip ring molded into the member at the bottom of the groove, a coil unit adapted to be inserted into the hollow member, a core adapted to be disposed in said apertures and extend through the coil unit, and bearing extensions carried by the member.

12. In an armature for magnetos and the like, a hollow body member of molded insulating material having a closed integral end with a peripheral groove, and also having apertures in its side walls, a slip ring in said groove, a bearing extension molded into the closed end, a cap having a bearing extension attachable to the open end of the member to close the same, a coil unit adapted to be inserted into the hollow member before the cap is applied, a core adapted to be inserted into the member and coil unit through the apertures, and pins adapted to be inserted in said body member across the apertures to secure the core therein.

13. In an armature for magnetos and the like, a hollow body member of molded insulating material having a closed integral end with a peripheral groove and also having apertures in its side walls, a slip ring in said groove, a bearing extension on the closed end, a cap having a bearing extension attachable to the open end of the member to close the same, a coil unit adapted to be inserted into the hollow member before the cap is applied, a laminated core adapted to be inserted into the member and coil unit through the apertures, pins of magnetic material adapted to be inserted in said body member across the apertures to secure the core therein, and insulating sleeves surrounding at least the portion of each pin within the core.

14. In an armature for magnetos and the like, a hollow body member of non-magnetic material having a closed and an open end and apertures in its side walls, a bearing extension on said closed end, said member having a plurality of spaced slits extending from the open nearly to the closed end, a cap of insulating material secured to the open end of the member to close the same, and rigidly connect its split ends, a bearing extension carried by the insulating cap, a coil unit adapted to be inserted into the member through the open end before the cap is applied, and a core adapted to be inserted into the coil and body member through the aperture.

In witness whereof, I hereunto subscribe my signature.

RICHARD VARLEY.